May 13, 1930.  D L. MARKLE  1,758,613
THREAD PROTECTOR FOR PIPES
Filed Nov. 25, 1927
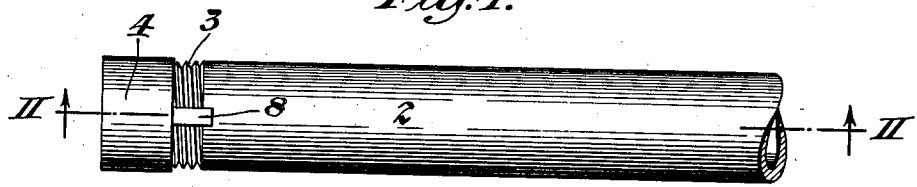
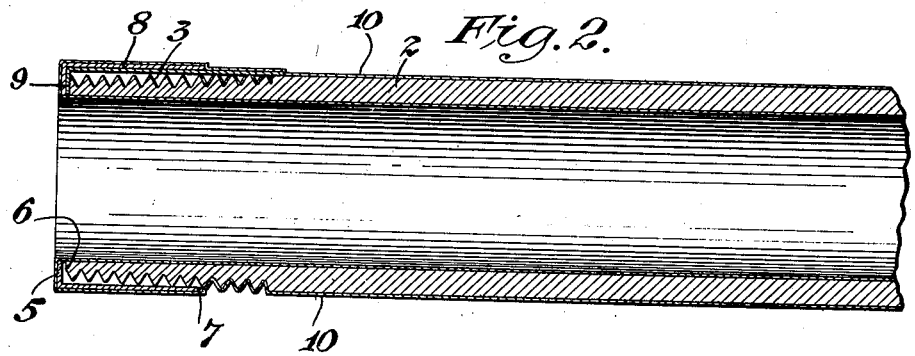
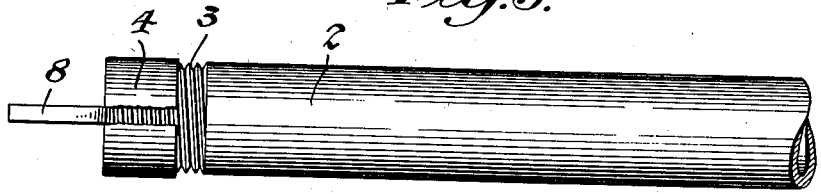
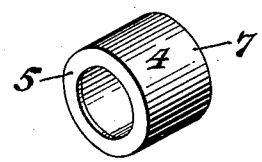
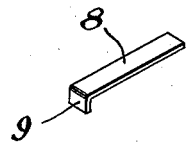
Inventor
D L afel Markle
By his Attorney
Clarence Kerr Patented May 13, 1930

1,758,613

UNITED STATES PATENT OFFICE

D LAFAL MARKLE, OF EVANSTON, ILLINOIS, ASSIGNOR TO CLAYTON MARK & COMPANY, OF CHICAGO, ILLINOIS, A CORPORATION OF ILLINOIS

THREAD PROTECTOR FOR PIPES

Application filed November 25, 1927. Serial No. 235,520.

My invention relates to thread protectors for pipe and conduit. It has been customary for many years preparatory to shipping threaded pipe, particularly where enamel or similar coatings are applied to the pipe bodies, to use some protective means to keep the coating from filling up the threads and rendering subsequent use of the threads difficult and also to protect the threads from corrosion and injury during transit and storage, but such means if durable have been too difficult to apply and remove, and if easy to apply and remove have not been sufficiently durable to remain upon and protect the pipe during transit and storage. Thread protectors embodying my invention are easy to apply, prevent the threads from becoming filled with the coating material during the pipe coating process, are sufficiently durable to give adequate protection against mechanical injury and corrosion during transportation and storage and may be instantly and readily removed without the use of any special tool. To this end my improved protector is comprised of a metal sufficiently deformable to seize the threads and thus be maintained in position thereon, and is yet stiff enough to prevent injury to the pipe, while being of a character to be torn from the end of the pipe. My invention also comprises various features which I shall hereinafter describe and claim.

In the accompanying drawings, Fig. 1 is a plan of a pipe end showing the application of a thread protector embodying my invention; Fig. 2 is a section on line II—II of Fig. 1; Fig. 3 is a view similar to Fig. 1, but with the protector cut or torn by the shear piece and ready to be removed; and Figs. 4 and 5 are perspectives of the ferrule and shear piece, respectively, of the thread protector.

Referring more specifically to the drawings, I have shown my invention applied to the pipe or conduit 2, which has exterior threads 3 at its end which are normally tapered, i. e., are of increasing diameter in a direction away from the pipe end. To these threads is applied my two-part thread protector, the part 4 of which is in the form of a ferrule composed of a thin sheet metal, such as aluminum, with its flanged outer end 5 intended to bear against the end section 6 of the pipe, while its inner end 7 is of slightly greater diameter than the outer end to permit the ferrule to accommodate itself to the taper of the threaded portion 3 of the pipe. The other part 8 of the protector acts as a shear of the ferrule and is composed of steel or other comparatively hard and tough metal. The shear 8 is in the form of a flat, narrow piece with an angled end 9.

In applying the protector to the pipe end the shear 8 is put in position with its angled end 9 engaging the end 6 of the pipe, and its flat or body portion lying across the threads or extending lengthwise of the pipe. The ferrule 4 is then passed over the pipe end with the shear 8 upon it until the flanged end 5 engages the pipe end 6 and also the angled end 9 of the shear. The ferrule is then squeezed or rolled so as to compress the metal into the threads and thereby provides an interlock with the threads to hold the protector firmly in place.

It will be seen that when the ferrule has thus been applied it acts as a retainer for the shear 8, because the angled end 9 of the shear is held firmly between the pipe end 6 and the ferrule flange 5, and cannot be displaced accidentally. The inner edge of the ferrule preferably terminates short of the inner end of the threads, so that the edge of the protector will be less liable to be abraded than if it was extended beyond the end of the threads, and at the same time permits the coating 10 to cover and protect the threads in a region in which they are frequently left exposed by a short coupling. The ferrule effects practically a water-tight protection for the threads, which keeps them clean, dry and sharp while the ferrule is in position.

To remove the protector, the end of the shear which extends beyond the edge of the ferrule is either pulled away or forced away from the pipe toward the end of the pipe, thus tearing or cutting the ferrule from end to end so that it will drop off or be easily removed.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. A thread protector for pipes in combination with a pipe having a tapering thread at its end; a seamless metal sleeve fitting against the threaded portion of the pipe and having an annular flange engaging the end of the pipe; and a shear for the sleeve interposed between the sleeve and the threads, and having an anchorage between the flange and the pipe end, said shear being adapted to tear the wall of the sleeve to permit its ready removal, said protector being adapted to prevent abrasion of the thread during transportation and protect it against corrosion.

2. A thread protector for pipes in combination with a pipe having a tapering thread at its end; a seamless metal sleeve having its wall compressed into the recesses between the threads to secure the sleeve to the pipe, said sleeve having an annular flange engaging the end of the pipe; and a shear for the sleeve interposed between the sleeve and the threads, said shear being adapted to tear the wall of the sleeve to permit its ready removal, said protector being adapted to prevent abrasion of the thread during shipping and filling of the protected thread during coating, storage, and shipping.

3. A thread protector for pipes in combination with a pipe having a tapering thread at its end; a seamless metal sleeve fitting against the threaded portion of the pipe and having an annular flange engaging the end of the pipe; and a shear composed of metal different from that of the sleeve interposed between the sleeve and the threads, said shear being adapted to tear the wall of the sleeve to permit its ready removal, said protector being adapted to prevent abrasion of the thread during transportation and protect it against corrosion.

4. A thread protector for pipes in combination with a pipe having a tapering thread at its end; a seamless metal sleeve fitting against the threaded portion of the pipe and having an annular flange engaging the end of the pipe; said sleeve being adapted to prevent abrasion of the thread during transportation and protect it against corrosion, a shear for the sleeve interposed between the sleeve and the threads, said shear being adapted to tear the wall of the sleeve to permit its ready removal; and means on the shear engaged by the flange for holding the shear in operative position between the threads and the sleeve.

5. A thread protector for pipes in combination with a pipe having a tapering thread at its end; a seamless aluminum sleeve fitting against the threaded portion of the pipe and having an annular flange engaging the end of the pipe; and a flat steel shear for the sleeve interposed between the sleeve and the threads, said shear being adapted to tear the wall of the sleeve to permit its ready removal, the sleeve being interlocked with the thread to prevent removal and to prevent a coating from filling the threads beneath the sleeve.

6. A thread protector for pipes in combination with a pipe having a threaded end; a seamless flanged metal sleeve fitting against the end and threaded portions of the pipe; and a flat metal shear adapted to tear the wall of the sleeve, said shear being held in position by having an angled portion engaging the end of the pipe, the sleeve being compressed into the threads to prevent removal and to prevent a coating from filling the threads beneath the sleeve.

7. A thread protector for pipes in combination with a pipe having an exteriorly threaded end and a seamless flanged metal sleeve fitting against the end and threaded portion of the sleeve and being adapted to be deformed to interlock between the threads of the pipe, and an angled flat metal shear, the angled portion of the shear engaging the end of the pipe and body portion lying within the sleeve and extending along the exterior of the pipe wall beyond the inner end of the sleeve, said shear being adapted to tear the wall of the sleeve to permit its removal and expose the threads, said protector comprising means to protect the thread against corrosion, prevent abrasion during transportation and filling of the protected threads during enameling, storage and shipping.

D LAFAL MARKLE.